MAGNETOSTATIC MICROWAVE DEVICES

Filed Dec. 5, 1958

INVENTOR
P. K. TIEN
BY Roy M. Porter Jr.
ATTORNEY

INVENTOR
P. K. TIEN
BY Roy M. Porter Jr.
ATTORNEY

Jan. 9, 1962 P. K. TIEN 3,016,495

MAGNETOSTATIC MICROWAVE DEVICES

Filed Dec. 5, 1958 6 Sheets-Sheet 3

INVENTOR
P. K. TIEN

BY Roy M. Porter, Jr.

ATTORNEY

INVENTOR
P. K. TIEN
BY Roy M. Porter Jr.
ATTORNEY

INVENTOR
P. K. TIEN
BY Roy M. Porter Jr.
ATTORNEY

Jan. 9, 1962 P. K. TIEN 3,016,495

MAGNETOSTATIC MICROWAVE DEVICES

Filed Dec. 5, 1958 6 Sheets-Sheet 6

INVENTOR
P. K. TIEN
BY Roy M. Porter, Jr.
ATTORNEY 3,016,495
Patented Jan. 9, 1962

3,016,495

MAGNETOSTATIC MICROWAVE DEVICES

Ping K. Tien, Chatham Township, Morris County, N.J., assignor to Bell Telephone Laboratories, Incorporated, New York, N.Y., a corporation of New York Filed Dec. 5, 1958, Ser. No. 778,352
21 Claims. (Cl. 330—56)

This invention relates to microwave frequency devices which make use of the various modes of precession which can be induced in the spin systems of materials exhibiting gyromagnetic properties. More particularly, it is directed to devices which employ one or more of the sharply defined resonance absorption peaks indicative of said modes which, under appropriate conditions, are characteristic of high resistivity gyromagnetic materials.

The use of gyromagnetic materials in electro-magnetic wave transmission systems has given rise to a host of new and extremely useful transmission components. These components utilize the unusual properties of gyromagnetic materials which arise as a consequence of the precession of the magnetic moment of certain atomic particles in such materials under the influences of externally applied magnetic fields.

As is well known to those skilled in the art, currently known gyromagnetic materials, when formed into a polycrystalline mass and subjected to the combined action of a unidirectional magnetizing field and an orthogonally directed microwave radio frequency field, will exhibit, over a particular range of magnetizing field intensities for each specific microwave frequency, a very pronounced tendency to absorb a substantial portion of the radio frequency energy. This effect occurs when the natural precessional frequency of the electron spins within the gyromagnetic medium is approximately equal to the frequency of the applied radio frequency signal. Under these conditions, large amounts of energy are transferred from the signal to the spin system. For a given operating frequency, this gyromagnetic resonance absorption characteristic occurs over a range of magnetizing field intensities. Conversely, for a given magnetizing field intensity, gyromagnetic resonance absorption occurs over a range of operating frequencies. If the range of either the magnetizing field, or the frequency within which appreciable absorption takes place is relatively broad, the particular specimen is said to have a broad or wide gyromagnetic resonance absorption peak, or line. For example, a typical polycrystalline specimen will exhibit a single resonant absorption peak having a width in the order of 150 oersteds or 420 megacycles.

As a consequence of this behavior, resonantly biased polycrystalline gyromagnetic materials have been used almost exclusively as attenuating elements in microwave components. On the other hand, when gyromagnetic materials are used as coupling elements in power dividing networks wherein power losses are to be minimized, it has been necessary, in the past, to operate in a region substantially removed from resonance. This, notwithstanding the fact that the amount of energy coupled by the gyromagetic material is a function of the amplitude of the magnetic precession, which amplitude is greatest at resonance. This manner of operation has been necessary since any attempt to increase the coupling between the several branches of the power dividing network by increasing the amplitude of the magnetic precession by biasing the magnetic sample nearer to resonance has proved impractical because the resulting attenuation experienced by the signal has tended to increase at a faster rate than the coupling.

It is, therefore, an object of this invention to efficiently couple wave energy between branches of a microwave transmission system by means of resonantly biased gyromagnetic materials.

Devices of the present invention are made possible by virtue of the fact that a small amount of material, cut from a single crystal of gyromagnetic material having a high resistivity, has a resonance bandwidth or linewidth that is perhaps one-hundredth the bandwidth of currently known polycrystalline materials. This means that for a given size sample, the single crystalline material absorbs substantially less radio frequency wave energy at resonance than the polycrystalline material. In addition, the amplitude of the magnetization vector components perpendicular to the biasing field tend to increase at a faster rate, in the region of resonance, than does the resonance absorption effects. Consequently, for a given amount of coupling, the size of the sample used may be reduced, further reducing the losses occasioned by operating such single crystalline gyromagnetic material at resonance. Thus, by virtue of their high Q, it is now completely feasible to use resonantly biased single crystalline gyromagnetic materials as the coupling elements in highly efficient power dividing networks. Because they are operated at resonance, the size of the sample needed for a given degree of coupling is substantially smaller than that required in the prior art couplers.

It is a further property of high resistivity gyromagnetic materials, that they exhibit a distinctive set of as many as ten or more discrete gyromagnetic resonance absorption peaks, rather than just a single peak as is normally found in currently available polycrystalline materials. Thus, for a given operating frequency, power absorption can take place at any one of a number of distinct magnetic biasing fields. These so-called "higher order modes" or "magnetostatic modes" may be induced by means of an unhomogeneous radio frequency exciting field, and are of particular interest in power dividing networks in that the phase of the induced field coupled through the material is a function of the particular mode induced, and can be altered by changing the magnetic biasing field strength. It is thus possible to control the phase, and consequently to control the direction of flow, of coupled microwave energy by the simple expedient of changing the magnitude of the biasing field applied to the gyromagnetic material.

In the copending application of A. M. Clogston, Serial No. 571,185, filed March 13, 1956, now United States Patent No. 2,948,870, issued August 9, 1960, four of the many modes of precessional vibration which can be induced in high resistivity gyromagnetic materials are shown. Also shown are the radio frequency magnetic field patterns which may be used to induce these modes, which patterns may be the result of inducing, in a wave transmission path, the appropriate transmission mode or by inducing in a resonant cavity standing waves having the requisite field configuration. In accordance with the prior art, the gyromagnetic sample is appropriately placed in the region of the wave supporting structure in which the high frequency field has the required space distribution to produce the desired mode. This procedure has several disadvantages, however. First, it may require the generation of complex wave patterns. This requirement may unduly complicate what would be a relatively simple system. Second, it necessitates the use of large gyromagnetic elements. The latter requirement is a consequence of the fact that the field strength of the radio frequency waves vary uniformly across the dimensions of the wave supporting path and pass through zero in the region of phase reversals, which is the region in which the sample is generally placed. Consequently, the gyromagnetic material must be sufficiently large to extend from the zero region into a region of substantial field strength.

The size of the sample may, of course, be reduced if the strength of the fields are increased by increasing the signal power, but this is not an attractive alternative. It is apparent that more efficient results can be obtained using smaller samples placed in a region of maximum field gradient.

It is, therefore, an additional object of this invention to produce unhomogeneous field patterns in gyromagnetic materials located in a region of maximum high frequency field gradient.

The various unusual phenomena described above are believed to be associated with various modes of precession of the gyromagnetic spin systems of the specific specimens under the prescribed conditions. Low resistivity materials, for example, do not usually exhibit any such complex multipeak absorption characteristics and this is believed to result from the generation of eddy currents which prevent such precessions.

To avoid frequent repetition, throughout the remainder of this specification the term "ferrite" will be used to designate the high resistivity single crystalline gyromagnetic material of the type described above. It is to be understood, however, that other ferromagnetic or gyromagnetic materials of appropriate resistivity and crystalline structure can also be employed.

In accordance with the invention, elements of resonantly biased ferrite are employed to couple electromagnetic wave energy from one waveguide section to one or more other waveguide sections. The ferrite coupling elements extend into the several waveguiding paths through apertures in the path walls. It is a feature of the invention that the ferrite elements are so located in the waveguiding paths as to establish within the ferrite a nonuniform high frequency magnetic field having a maximum rate of change in field intensity. This, in conjunction with the fact that the ferrites are biased to a condition of gyromagnetic resonance, permits the use of exceedingly small ferrite samples. The apertures in which the ferrites are located are also small, and in general are sufficiently small compared to the wavelength of the signal frequency as to substantially preclude the transfer of any appreciable power between guides in the absence of the resonantly biased ferrite. The amplitude of the induced components of energy depend upon the polarizng magnetic field, and the size of the ferrite sample. The relative phase of the induced components depend upon the particular magnetostatic mode induced in the ferrite, which in turn is a function of the location of the ferrite in the aperture, the shape of the inducing high frequency magnetic field, and the strength of the biasing magnetic field.

These and other objects, the nature of the present invention and its various features and advantages will appear more fully upon consideration of the various specific illustrative embodiments shown in the accompanying drawings and analyzed in the following detailed descriptions of these drawings.

Figure 1:
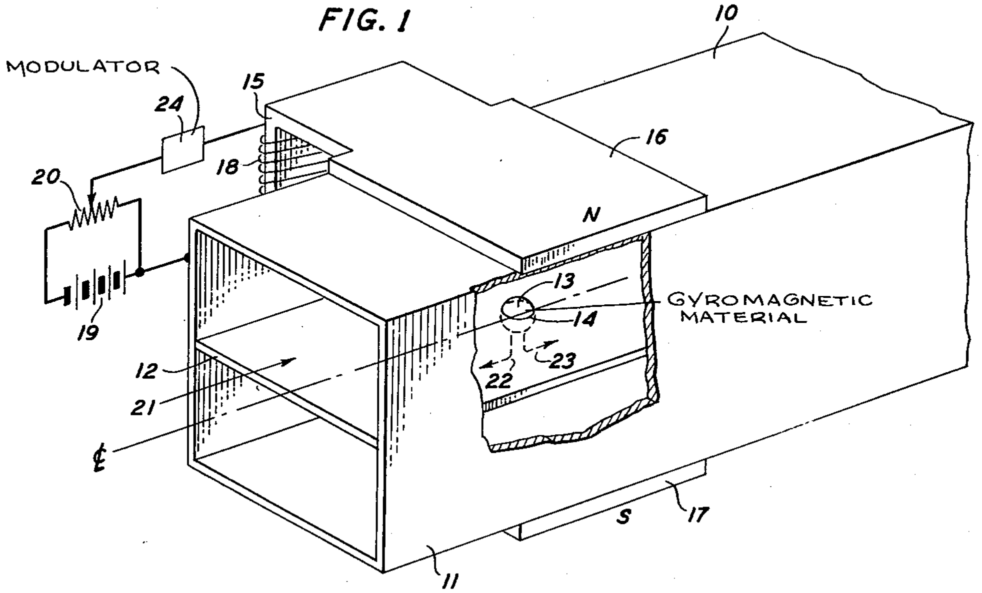
FIG. 1 is a partially cut-away view of a coupler constructed in accordance with the invention.

Referring now to the accompanying drawings, and more specifically to FIG. 1, there is shown a microwave power dividing network in accordance with the invention. This network comprises a first section 10 of bounded electrical transmission line for guiding electromagnetic wave energy, which line may be a rectangular waveguide of the metallic shield type having a wide internal cross-sectional dimension of at least one-half wavelength of the wave energy to be conducted thereby, and a narrow dimension substantially one-half of the wide dimension. So constituted, this waveguide operates in the dominant mode, known in the art as the $TE_{10}$ mode, in which the high frequency magnetic flux lines form closed loops which lie in planes parallel to the wider walls of the waveguide. Located adjacent to line 10 and running for a portion of its length contiguous and parallel thereto is a second section 11 of transmission line substantially identical to guide 10. As illustrated, guide 10 and guide 11 share a common wide wall 12.

Lines 10 and 11 are electromagnetically coupled by a polarized gyromagnetic coupling element 13 which, as illustrated, may be spherical in shape, and is located in aperture 14 along the center line of wall 12. The diameter of aperture 14 is sufficiently small compared to the wavelength of the signal frequency as to substantially preclude the transfer of power between guides 10 and 11 in the absence of element 13.

Element 13, having a diameter approximately the same as aperture 14, is symmetrically located in aperture 14 so that equal amounts of gyromagnetic material extend into guides 10 and 11. While, for the purposes of illustration, element 13 is indicated as spherical in shape, it is understood that it may assume any other convenient shape such as a cylindrical or rectangular shape without affecting the operation of the device.

As a specific illustration of the gyromagnetic medium, element 13 is a sphere of single crystal ferrite of high resistivity of the type described in the copending application of J. F. Dillion, Jr., Serial No. 571,226, filed March 13, 1956.

Element 13 is biased by means of a steady polarizing magnetic field of a strength to be described. As illustrated in FIG. 1, this field is applied transversely, i.e., at right angles to the direction of propagation of wave energy in guide 10 and is supplied by a solenoid structure comprising a C-shaped magnetic core 15 having pole pieces 16 and 17. Turns of wire 18 are wound on core 15 and connect to a source of potential 19 through rheostat 20, and a modulator 24. The biasing field may, however, be supplied by an electric solenoid with a magnetic core of other suitable physical design, by a solenoid without a core or by a permanent magnet constructed with suitable means for varying the magnetic flux.

Before proceeding further with a detailed examination of the operation of the power dividing network of FIG. 1 and the adjustments necessary to obtain this operation, the unusual properties of a single crystalline, high resistivity gyromagnetic coupling element (including within the term "coupling element" both ferrite element 13 and its associated conducting plane 12 and aperture 14, as it serves to couple magnetic field components from within guide 10 into guide 11) must be thoroughly understood.

As is well known to those skilled in the art, small signal measurements made with polycrystalline gyromagnetic materials have disclosed a single resonance absorption peak having a "width" in the order of 150 oersteds or 420 megacycles. It has since been discovered, however, that a saturated ferromagnetic body in a uniform direct current magnetic field possesses a spectrum of modes of free oscillation and thus exhibit a series of distinct absorption peaks. A necessary condition for the excitation of these multiple absorptions or higher order magnetostatic modes is that the radio frequency magnetic exciting field in the sample be unhomogeneous.

Figure 2:
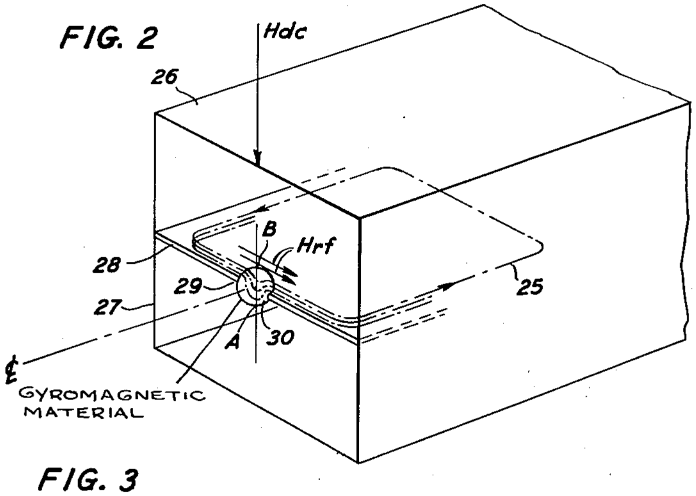
FIGS. 2 and 3 show, by way of illustration, the field distribution in the ferrite material used to couple the two transmission paths shown in FIG. 1.
Figure 3:
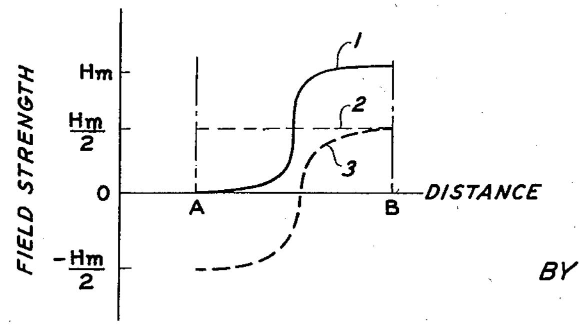

In FIG. 2 there is shown a representative loop 25 of the high frequency magnetic field of a dominant mode wave in rectangular wave guide 26 at a particular instant of time. This loop is merely representative of the many loops indicated by the arrows labeled $H_{rf}$ which lie in planes parallel to the wide dimension of guide 26. Located with its center along the center line of the common wall 28 between guides 26 and 27 is aperture 29 in which is situated a sphere of ferrite 30. So situated, the ferrite 30 is excited by the radio frequency magnetic field components transverse to the direction of propagation and the orthogonally directed steady magnetizing field $H_{dc}$. Within the ferrite itself, the magnetic field lines are distorted, subjecting the ferrite to a nonuniform field. If the variation in field strength along a line A—B parallel to the magnetizing field $H_{dc}$ is plotted, a curve, 1, such as that shown in FIG. 3 is obtained. The field is seen to vary from substantially zero field strength at A, to a maximum, $H_m$, at B. This field distribution may be regarded as comprising two components. A first component, having an amplitude of one-half the maximum, $H_{m/2}$, is a uniform component as shown by curve 2 in FIG. 3. A second component, shown by curve 3 in FIG. 3, varies in a manner similar to the variation of curve 1, except that the direction or phase of the field is reversed in the lower half of the ferrite sphere. As shown by curve 3, the field at point A is $-H_{m/2}$, decreases in amplitude to zero, and increases to $+H_{m/2}$ at B.

The ferrite sample may be considered as an assembly of small magnets or "spins" which, under the influence of the direct-current magnetizing field are all aligned in a direction parallel to that field. Under the influence of a high frequency magnetic field component directed perpendicular to the magnetizing field, the spins are caused to precess about the direction of the direct-current field and to produce, thereby, transverse high frequency magnetization components normal to the direct-current field. The induced magnetization is a maximum when the direct-current field and the frequency of the radio frequency field are adjusted to particular values such that the natural precessional frequency of the electron spins is equal to the frequency of the applied high frequency energy. For the most common resonance condition, all the spins precess in the same direction, i.e., in the same sense about an axis parallel to the direct-current field. This may be considered to correspond to the precession caused by the uniform radio frequency field distribution shown by curve 2 of FIG. 3. This type of precession, or mode, known as the Kittell resonance, is designated as the 1,1,0 mode and is graphically depicted in FIG. 4 by a series of parallel arrows, pointing in the same direction above and below the conducting plane 28.

Figure 4:
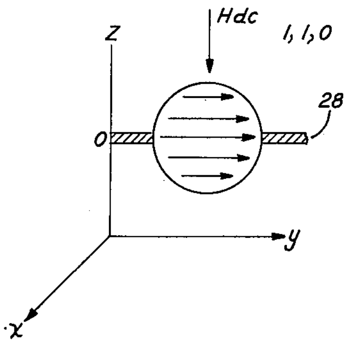
FIGS. 4, 5, 6 and 7 show, by way of illustration, the precessional modes induced in the ferrite material employed in the device shown in FIG. 1.
Figure 5:
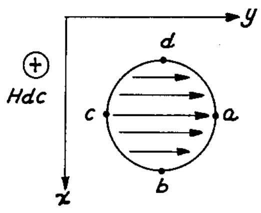

The general mode notation *n,m,r*, of which the 1,1,0 mode is but one possibility, is descriptive of the alignment of the magnetization components normal to the direct-current polarizing field. In an *x,y,z* Cartesian coordinate system, as shown in FIG. 4, in which *z* is the direction parallel to the direct-current magnetizing field, the *m*, in the *n,m,r* designation, represents the number of cyclical variations in the instantaneous direction of the magnetization vectors as viewed by an observer traversing a closed path about the periphery of the ferrite sample in any *x*—*y* plane. Thus, in FIG. 5, which represents a section of the ferrite sample in a plane parallel to the *x*—*y* plane of the coordinate system, starting at point *a* and proceeding clockwise along path *a b c d a*, it is observed that the direction of the magnetization vectors faces the observer at *a*, are directed away from him at point *c* and again faces him at *a*. Thus, there is one cyclical variation in the direction of these vectors and *m* is equal to one. On the other hand, *n* is chosen so that $(n-m)$ designates the number of variations in the instantaneous direction of the magnetization vectors along the *z* axis. Thus, in FIG. 4, proceeding along the *z* axis, it is observed that the magnetization vectors all point in the same direction. Hence, there are no variations along the *z* axis and $(n-m)=0$ and $n=m$. Thus, in the instant case, $n=1$. *r* is related to other characteristics of the magnetostatic modes and has a value of zero for those modes of immediate interest.

Figure 6:
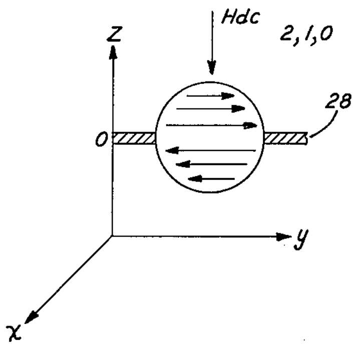

As the direct-current magnetization is changed, however, the influence of the steady radio frequency field distribution of curve 2 of FIG. 3 diminishes, and at another value of direct-current field, the nonuniform field of curve 3 of FIG. 3 is controlling. At this value of direct-current magnetization, the sense of the precession in the lower half of the ferrite sphere 30 of FIG. 2 is in the opposite direction of that of its upper half. This anomalous precession may be considered as being induced by the radio frequency field configuration of curve 3, wherein the direction of the radio frequency field is opposite for each half of the sphere. This mode is represented in FIG. 6 as the 2,1,0 mode and is depicted in the illustration by the oppositely directed arrows on either side of conducting plane 28.

Figure 7:
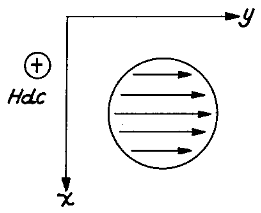

It will be noted, in accordance with the rules outlined above, that for the 2,1,0 mode there is one cyclical variation around a closed path in any *x*—*y* plane such as the one shown in FIG. 7, and hence $m=1$. However, along the *z* axis, there is one reversal in the instantaneous direction of the magnetization vectors and therefore $(n-m)$ must equal one, or *n* equals two. Thus, as indicated above, this mode is properly designated the 2,1,0 mode.

In the operation of the structure shown in FIG. 1, energy is applied to guide 10 as indicated by arrow 21. Element 13 is magnetically biased at a level controlled by potentiometer 20 so as to induce therein one of the possible magnetostatic resonant modes. When so biased, a portion of the incident energy 21 is coupled by means of the ferrite into guide 11 and excites in guide 11 a pair of oppositely directed traveling waves shown by arrows 22 and 23 respectively. When the ferrite 13 is operating in the 1,1,0 mode, the phase of the induced wave lags that of the inducing wave by 180°. When operating in the 2,1,0 mode, however, an additional 180° phase reversal introduced by the ferrite results in the induced and driving waves being in phase. Thus, by changing the magnetic bias applied to the ferrite sample, the magnetostaic mode induced is changed and consequently the phase of the induced wave is changed by 180°.

As mentioned earlier, the resonant line widths for high resistivity single crystalline ferrites is approximately one-tenth that of polycrystalline ferrites, being of the order of only a few oersteds. Since aperture 14 is sufficiently small to preclude the transfer of any substantial amount of power between guide 10 and 11 in the absence of the resonantly biased ferrite 13, the coupled energy may be conveniently modulated by varying the magnetic bias applied to the ferrite. Since only a change of a few oersteds is needed to change the coupled energy from a maximum to zero, very short pulses of energy can be produced in guide 11 by this means. In FIG. 1, circuit component 24 shown in series with the magnetizing current circuit represents a modulating means for varying the biasing current and consequently the amplitude and phase of the energy induced in guide 11.

*Directional couplers*

Figure 8:
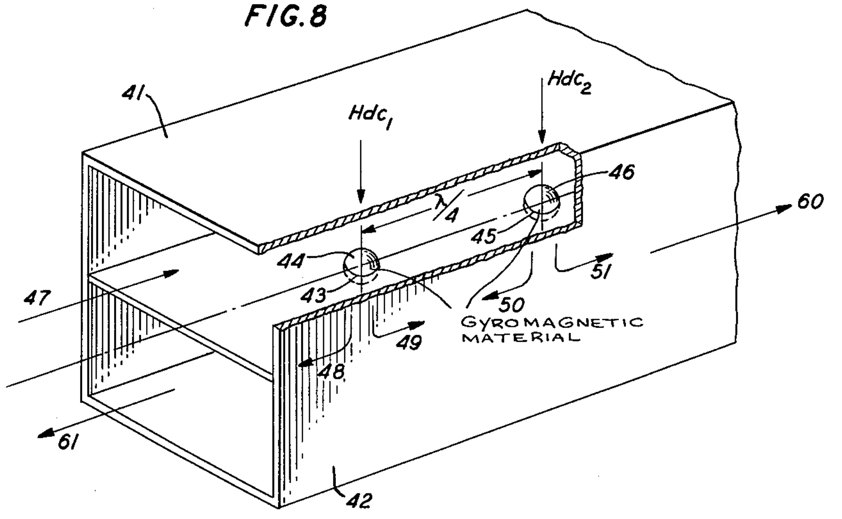
FIG. 8 is a partially cut-away view of a reversible directional coupler employing the coupling arrangement of FIG. 1.

FIG. 8 illustrates a directional coupler comprising a pair of couplers of the type described in relation to FIG. 1. In FIG. 8, guides 41 and 42 are arranged similar to guides 10 and 11 in FIG. 1, having, however, two apertures 43 and 45 and two ferrite elements 44 and 46 located therein. Ferrite element 44 is resonantly biased by means of field $H_{dc1}$ and ferrite element 46 is resonantly biased by means of field $H_{dc2}$. Energy applied to guide 41, indicated by arrow 47, is partially coupled into guide 42 at element 44, giving rise to oppositely traveling waves 48 and 49, and partially coupled into guide 42 at element 46, giving rise to the oppositely traveling waves 50 and 51. Waves 48 and 50, and waves 49 and 51 will add as they progress in opposite directions along guide 42, depending upon their relatives phases and amplitudes. If both ferrites 44 and 46 are excited in the same magnetostatic mode, i.e., the 1,1,0 mode, and are adjusted to couple equal amounts of energy from guide 41 to guide 42, the phase of the energy at element 46 lags that of the energy at element 44 by an amount corresponding to the electrical spacing between the elements. By adjusting the distance between ferrite elements 44 and 46 to be a quarter wavelength, wave 50 will combine with wave 48 180° out of phase and cancel, whereas component 49 will combine with wave 51 in phase proceed along guide 42 in the direction as indicated by arrow 60.

If, however, the magnitude of the magnetic bias $H_{dc1}$ applied to ferrite element 44 is changed so as to induce the 2,1,0 mode in element 44 as a result of which the energy coupled by elements 44 and 46 are 180° out of phase, components 49 and 51 will add 180° out of phase and cancel, whereas components 48 and 50 will add in phase and proceed along guide 42 as indicated by arrow 61. Thus, by changing the magnitude of the magnetic bias applied to one of the ferrite coupling elements, the directivity of the directional coupler is reversed.

*Three-way switch*

Figure 9:
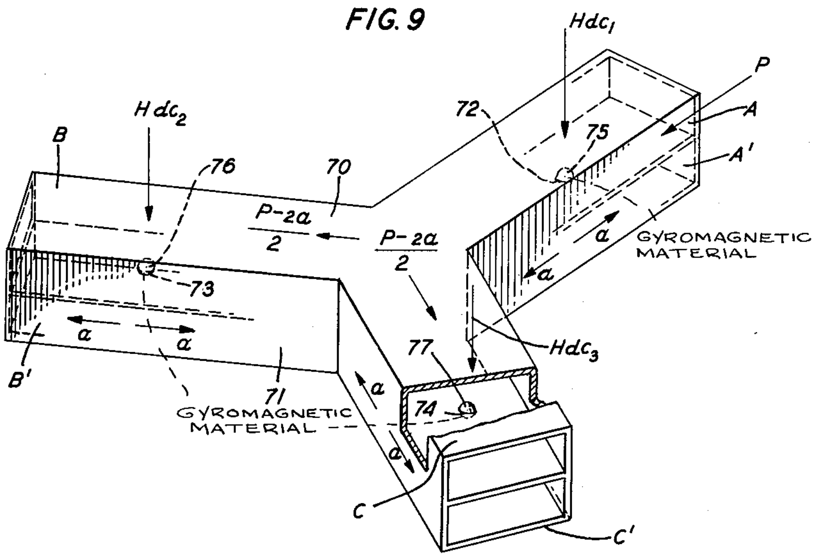
FIGS. 9 and 10 are illustrative of more complicated switching arrangements using coupled Y-networks.

The switching arrangements described above can be extended to comprehend more complicated switching devices. For example, in FIG. 9, a pair of symmetrical Y power dividing networks 70 and 71 are congruently placed so as to share a common wall region for a portion of each of the arms A, A′, B, B′ and C, C′. Apertures 72, 73 and 74 are centrally located in the common walls of each pair of arms respectively, and longitudinally spaced from each other so that the electrical length between any two apertures is a multiple of a whole wavelength of the signal frequency. Inserted in apertures 72, 73 and 74 are ferrite elements 75, 76, and 77 respectively, to which there are applied magnetic biasing field $H_{dc1}$, $H_{dc2}$ and $H_{dc3}$.

It is characteristic of the symmetrical Y that power fed into any one arm divides equally in the other two arms. In the configuration shown in FIG. 9 the coupling elements are designed so that the coupling between arms B and B′ and arms C and C′ is slightly greater than twice the coupling between arms A and A′. Thus, if a signal P is applied to arm A, an amount $2a$ is coupled into guide A′, or a wave $a$ is propagated in each direction in guide A′. The remaining power in guide A is divided equally between guides B and C. From these components, equal to P—$2a/2$, and amount $2a$ is coupled into guides B′ and C′ respectively. Designating energy coupled by the 1,1,0 mode as plus, and energy coupled by the 2,1,0 mode as minus, the following tabulation of the operation of the device of FIG. 9 can be made:

| Magnetostatic Mode | | | Power Output | | | Relative Phase of Output, degrees |
|---|---|---|---|---|---|---|
| A—A′ | B—B′ | C—C′ | A′ | B′ | C′ | ---------- |
| 1, 1, 0 | 1, 1, 0 | 1, 1, 0 | $a$ | $a$ | 0 | 0 |
| 2, 1, 0 | 1, 1, 0 | 1, 1, 0 | 0 | $a$ | $a$ | 0 |
| 1, 1, 0 | 2, 1, 0 | 1, 1, 0 | $a$ | 0 | $a$ | 0 |
| 1, 1, 0 | 2, 1, 0 | 2, 1, 0 | 0 | $a$ | $a$ | 180 |

From the above tabulation it is evident that the output power to any two arms and the relative phase of the power can be switched simply by varying the bias fields $H_{dc1}$, $H_{dc2}$ and $H_{dc3}$ between the 1,1,0 and the 2,1,0 modes. The principles described above can likewise be extended to four or more arms, provided that each arm contains at least one ferrite coupling element and that the distance between any two elements is a multiple of a whole wavelength.

Figure 10:
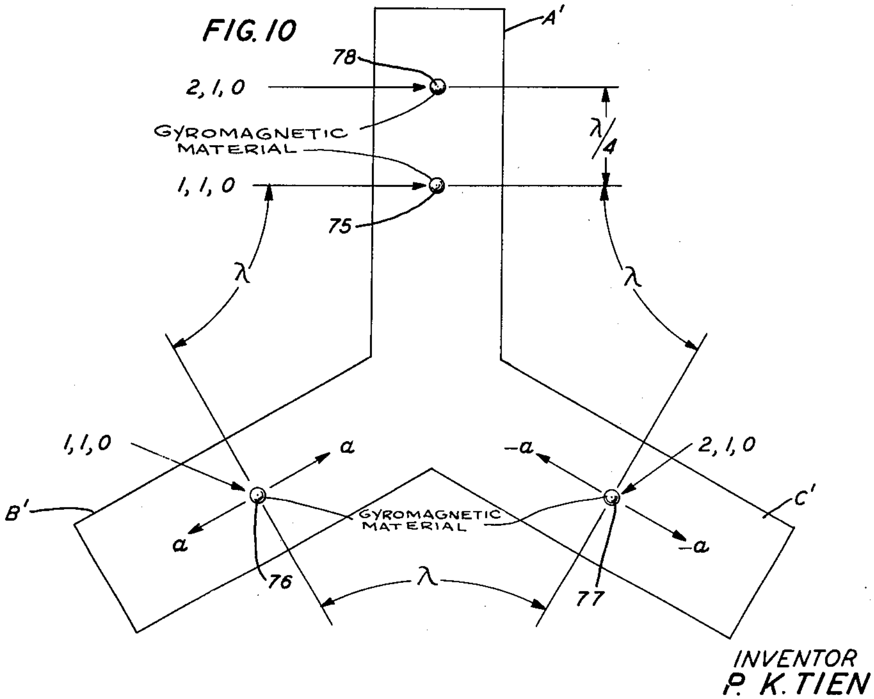

If it is desired to have power switched between guide B′ and C′ only, with no power coming from guide A′, a fourth coupling element is added as shown in FIG. 10. In this figure, which is a plane view of FIG. 9, a fourth coupling element 78 has been added between arms A and A′, spaced a quarter wavelength from coupling element 75, and biased, as shown, to the 2,1,0 mode. With element 76 in arms B—B′ biased to the 1,1,0 mode and element 77 biased to the 2,1,0 mode, the power out of arms A′ and C′ is zero, and the power out of arm B′ is $a$. Power can be switched from arm B′ to arm C′, by simply interchanging the modes induced in elements 76 and 77 in arms B′ and C′ respectively by changing the bias applied to these elements.

While the above illustrative embodiments of the invention utilize the 1,1,0 and 2,1,0 magnetostatic modes, the invention is not limited to these modes. Thus, in FIG. 11 multibranch coupling is achieved by means of a single ferrite coupling element operating in the 2,2,0 mode. This network comprises four sections of conductively bounded electrical transmission lines 80, 81, 82 and 83, which lines may be rectangular waveguide sections. The lines are located adjacent to each other and for a portion of their lengths they extend contiguous and parallel to each other sharing the intersecting common walls 84 and 85. Extending through the common walls 84 and 85, at their line of intersection, is aperture 86, in which there is located ferrite member 87. The ferrite is symmetrically disposed in the aperture, extending equally into each of the four guides.

Figure 11:
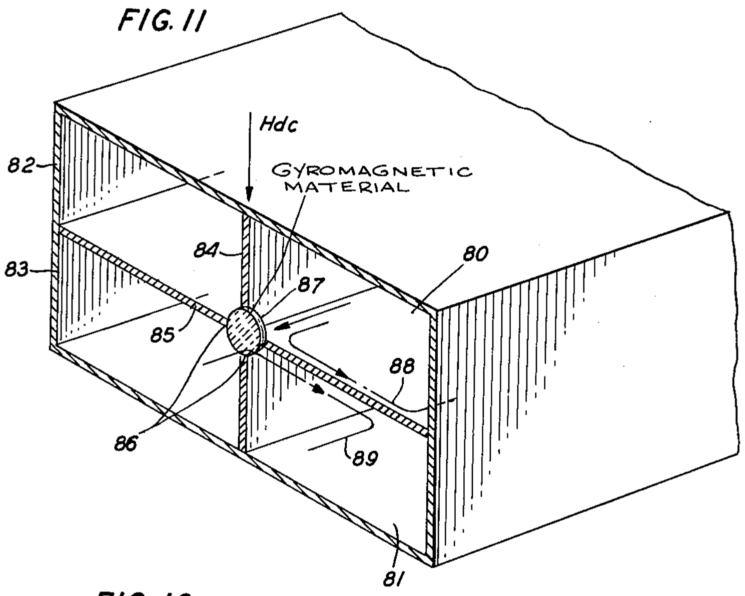
FIG. 11 is a four-branch coupling network.

Also shown in FIG. 11 are two representative loops 88 and 89 of the high frequency magnetic field of a dominant mode wave propagating in guide 80. At the particular instant depicted, a portion of each loop extends into the ferrite element 87. This is more clearly seen in FIG. 12, where the ferrite is shown as viewed in a direction parallel to the biasing field $H_{dc}$.

Figure 12:
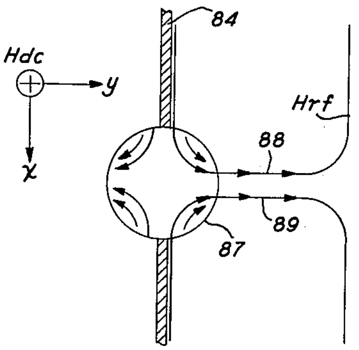
FIGS. 12 and 13 show, by way of illustration, the precessional modes induced in the ferrite located as shown in FIG. 11.
Figure 13:
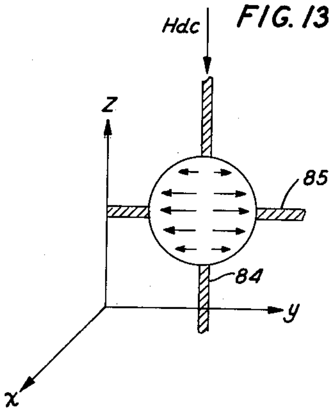

At a particular direct current biasing field, the high frequency magnetic field configuration shown will induce the 2,2,0 magnetostatic mode in the ferrite. This is shown in FIG. 12 and FIG. 13 where the instantaneous alignment of the magnetization components in the ferrite normal to the direct-current biasing field is illustrated. Following the rules indicated above, it can be seen that there are two cyclical variations in the direction of instantaneous magnetization vectors as viewed by an observer moving along a closed path about the ferrite in the $x$—$y$ plane and no variations along the $z$ direction. Hence $m=2$, $(m-n)=0$ and $n=2$, and this configuration is characterized as the 2,2,0 mode.

The operation of this type of coupler is similar to that described in connection with FIG. 1. Energy propagating in guide 80 excites the ferrite and magnetic field components are induced in the other three guides, thereby coupling energy from guide 80 to guides 81, 82 and 83. The energy will propagate in both directions but may be made directional by the addition of a second ferrite element as was done in the embodiment shown in FIG. 8.

Figure 14:
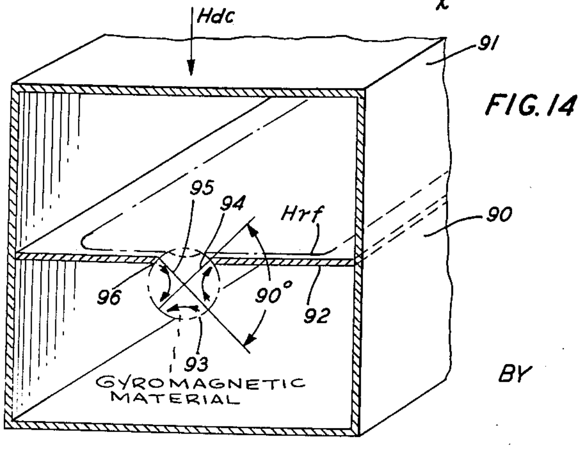
FIGS. 14, 15 and 16 show means for inducing higher order modes in ferrite materials.

The 2,2,0 mode may also be induced in a ferrite element used to couple between only two guides. Thus, in FIG. 14, a pair of waveguides 90 and 91 sharing a common wall portion 92 are coupled by means of ferrite element 93 asymmetrically disposed in aperture 96. The ferrite is shown extending a greater distance into guide 90 than into guide 91. The ferrite extends into guide 90 such that the pair of diameters 94 and 95 drawn from conducting wall 92 through the center of the ferrite sphere intersect at approximately 90°. So disposed, the radio frequency magnetic field in guide 91, represented by the portion of a loop $H_{rf}$, extends into the ferrite for only a small distance. Under these radio frequency field conditions and with the appropriate biasing field, $H_{dc}$, the 2,2,0 magnetostatic mode can be induced in element 93.

Figure 15:
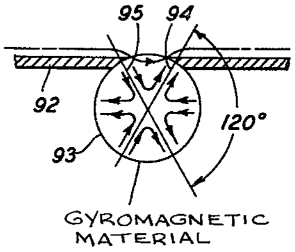

If the ferrite is further extended into guide 90 such that diameters 94 and 95 intersect at an angle of about 120°, as shown in FIG. 15, the 3,3,0 mode can be induced in element 93 under the appropriate biasing conditions.

Figure 16:
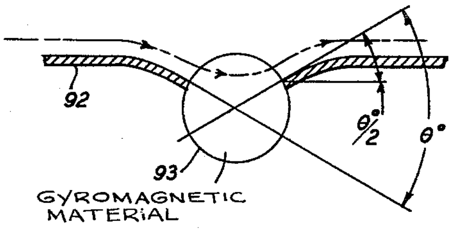

The effect, in either of the above mentioned cases may be enhanced by shaping the conductive partition 92 in the region of the ferrite as shown in FIG. 16. The tapering is such that the tapered wall portion in the immediate vicinity of the ferrite makes an angle with the untapered portion that is equal to one-half the requisite angle $\theta$, thereby making a more continuous path for the high frequency wave energy in the immediate region of the ferrite.

*Solid state amplifiers*

In the above described embodiments of the invention, the resonantly biased ferrite loaded aperture is used to couple energy at a particular frequency between two or more wave paths. In the embodiments to be described hereinafter, the resonantly biased ferrite loaded aperture is utilized to couple energy from one frequency to another frequency.

Figure 17:
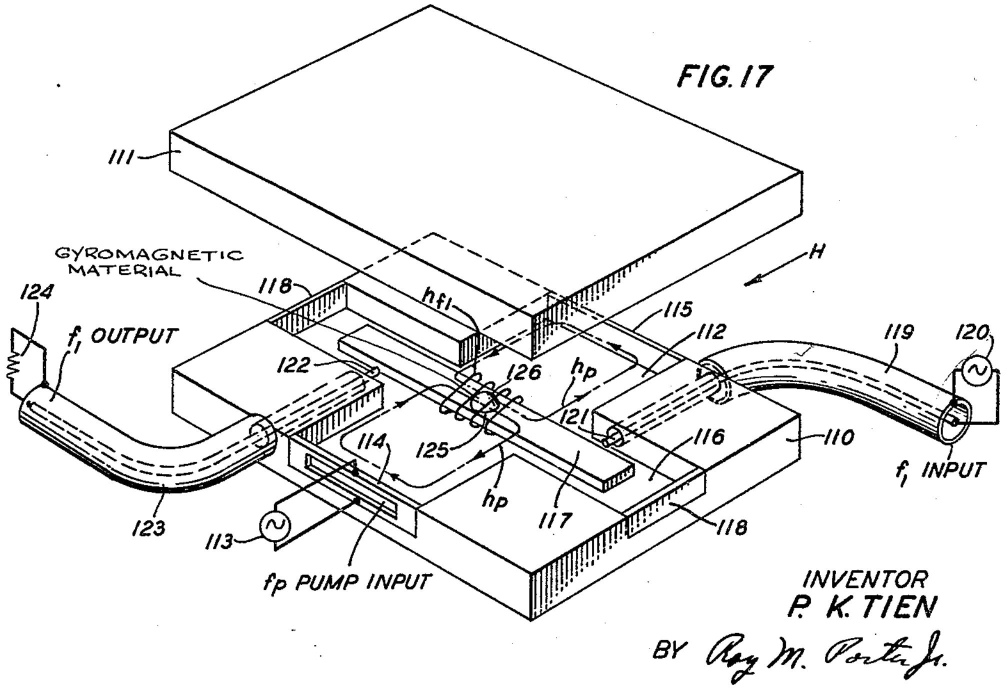
FIG. 17 is a perspective view of an amplifier constructed in accordance with the invention.

Referring more particularly to FIG. 17, a perspective view of a solid state amplifier embodying the teachings and features of the present invention is shown. Such an amplifier comprises two intersecting resonators which, for convenience, have been integrally constructed by milling or casting them in a block 110 having a suitable cover plate 111. The first of these resonators is of the waveguide type and comprises a rectangular channel 112 in block 110 having a wide dimension of greater than one-half wavelength and less than one wavelength at the so-called pumping frequency" $fp$. The input end of channel 112 is connected to a source 113 of pumping frequency $fp$ through an iris 114. The other end of channel 112 is terminated in a reflecting member 115. The distance between iris 114 and reflector 115 is a multiple of one-half wavelengths to produce resonance at the frequency $fp$.

The second resonator is of the strip transmission line type and comprises a channel 116 extending at right angles to channel 112. The wide dimension of channel 116 is small enough so that it is beyond cut-off at the frequency $fp$ and, therefore, does not interefere with the resonant cavity formed by channel 112. Suitably supported within channel 116 and extending longitudinally therein in a plane parallel to the top and bottom walls of channel 116 is a thin conductive member 117. Together with the top and bottom walls of channel 116, serving as the conductive ground planes therefor, member 117 forms a strip transmission line wave supporting structure 116—117. Member 117 may have cross-sectional dimensions that are somewhat smaller than the corresponding dimensions of channel 116. Member 117 is centered between the wide walls of channel 116 and extends an equal distance on either side of channel 112. Both sides of channel 116 may be terminated by conductive plates 118 for improved shielding.

Centered in member 117 is an aperture 125 in which there is inserted a ferrite member 126. The ferrite is symmetrically disposed in the aperture, extending equal amounts above and below the conductive plane formed by member 117.

A detailed discussion of the operation of this type of this type of amplifier is given in the copending application of M. T. Weiss, Serial No. 660,280, filed May 20, 1957, now United States Patent No. 2,978,649, issued April 4, 1961, As explained therein, a signal, at frequency $f_1$ is introduced into the strip transmission line by means of capacitive probe 121. As illustrated, the wave is applied from source 120 by way of coaxial line 119. The strip transmission line is proportioned to produce resonance at frequency $f_1$, setting up standing waves which have associated with them high frequency magnetic field lines. These lines consist of closed loops $h_{f1}$, which encircle conductor 117 and lie in planes perpendicular to its axis and which vary in intensity sinusoidally along the length of the conductor, being a maximum at the center of the line. In accordance with the present invention, ferrite element 126, extending above and below strip transmission line 117 is exposed to oppositely directed high frequency magnetic field components, thus subjecting the ferrite to a strong, nonuniform magnetic field which has a total variation across the ferrite equal to twice the maximum field strength. Under the influence of the nonuniform field and the direct current biasing field H, magnetostatic resonance is induced at the signal frequency in the ferrite element.

The magnetic field loops of the pumping frequency are illustrated by the closed $h_p$ comprising the standing wave pattern set up in cavity 112. These loops lie in planes which are parallel to the wide dimensions of cavity 112. Since cavity 112 is a multiple of half wavelengths in length, the magnetic field in the region of the ferrite is a maximum and exists substantially in a direction parallel to the strip transmission line. The ferrite is thus exposed to a uniform pumping field of maximum intensity. Under the influence of this radio frequency field and the direct current biasing field, H, a uniform precession of electron spins is induced in the ferrite, producing the above described 1,1,0 mode or Kittel resonance at the pump frequency.

The resonant circuit for the idler frequency $f_2$ is provided by a third resonant mode set up within the ferrite itself.

It may be noted that there is no direct coupling between the signal field $h_{f1}$ and the pump $h_p$, the components being orthogonally directed, or by virtue of the symmetry of the structure, having oppositely directed components whose integrated effects sum to zero. The exclusive coupling between the fields is provided by the ferrite material 126, which because of the multiple resonant operation, is maximized to produce a more efficient amplifier. In the illustrative embodiment of FIG. 17, the amplified energy is coupled out of the amplifier by means of capacitance probe 122 and delivered to the load 124 by means of coaxial cable 123.

Figure 18:
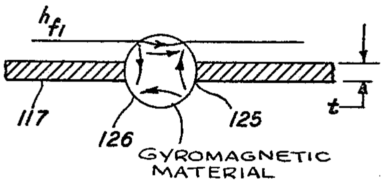
FIGS. 18 and 19 show, by way of illustration, means for inducing higher order modes in ferrite materials.
Figure 19:
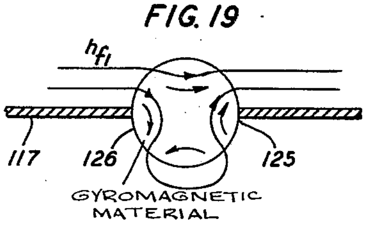

In this type of operation, the biasing field is generally fixed in amplitude. The magnetostatic modes must then be induced at the appropriate frequencies such that $f_p=f_1+f_2$. This may require that some adjustments be made to match the modes that are capable of being induced so as to correspond to these particular frequencies. It is therefore desirable to be able to induce several possible modes in the ferrite and then be able to pick the most useful one for the particular application at hand. Thus, if strip transmission line 117 is thin, and the aperture in which the ferrite is located is small, the 2,1,0 mode may be induced therein. However, by increasing the thickness T of strip transmission line 117, as shown in FIG. 18, the signal frequency magnetic field component $h_{f1}$ does not tend to penetrate the ferrite as thoroughly. This tends to excite the 2,2,0 mode configuration as shown in FIG. 18. Alternatively, by reducing the thickness of the line 117 and increasing the diameter of aperture 125, and ferrite element 126, more extensive penetation of the ferrite by the field $h_{f1}$ results, as shown in FIG. 19. This also tends to excite the 2,2,0 resonant mode. Hence, by varying the strip transmission line thickness and the diameter of the aperture and the ferrite and its shape, it is possible to induce the higher order magnetostatic modes, thus giving a degree of flexibility to the amplifier design.

There are, however, situations in which complete magnetostatic mode is not convenient or feasible. In these situations, magnetostatic resonance is only established at the pump and idler frequencies, the signal frequency resonance being established exclusively by the tuning of the strip transmission line. Substantial improvements in the efficiency of operation of the amplifier are still realized in this arrangement by virtue of the strong nonuniform signal frequency established at the ferrite, which nonuniformity greatly enhances the coupling between the idler energy and the signal energy.

Figure 20:
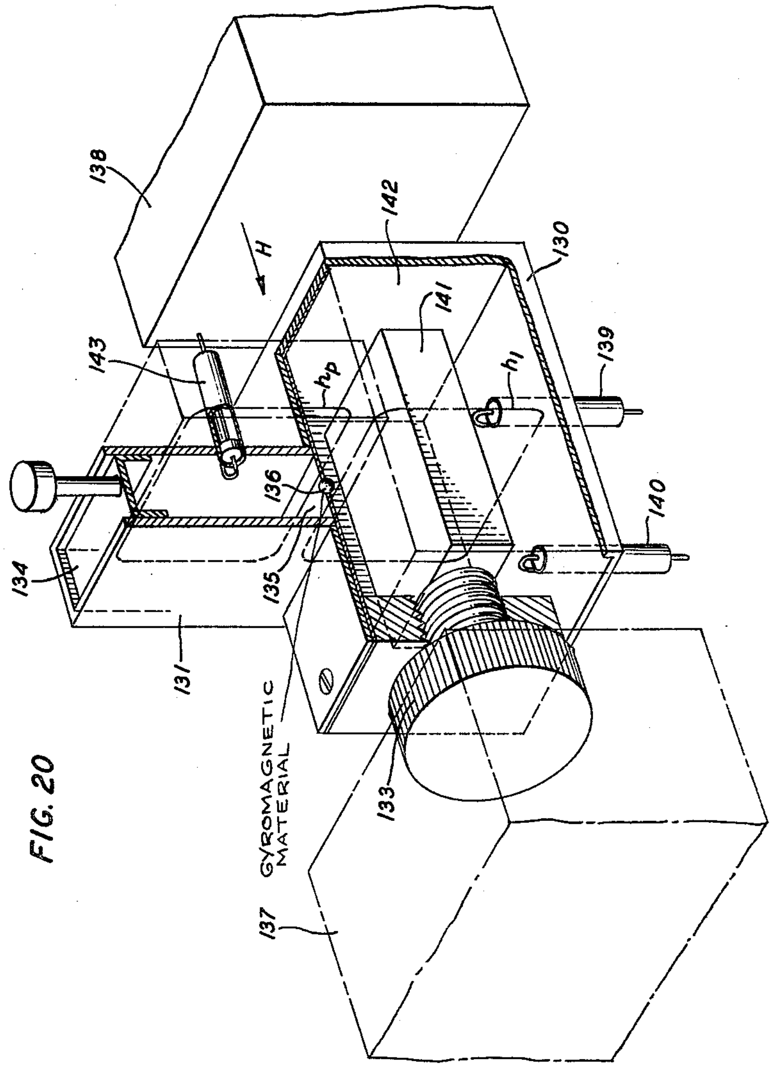
FIG. 20 is a second embodiment of an amplifier constructed in accordance with the invention.

Further improvements in this type of solid-state amplifier may be realized by physically separating the pump and signal frequency resonant cavities as well as electrically isolating these cavities, as in the aforedescribed embodiment. In accordance with the teachings of this invention, the two resonant cavities may be separated as shown in FIG. 20, and the necessary coupling provided by means of a ferrite member located in an aperture in a common wall region shared by the two cavities. Thus, in FIG. 20, a first cavity 130 and a second cavity 131 share a common wall portion 135 in which there is located ferrite element 136. The ferrite is symmetrically located with respect to the plane of the common wall and extends an equal distance into each of the cavities. One of the advantages of this type of arrangement is that the two cavities may be separately adjusted and tuned. Cavity 130 is of the so-called "re-entrant" type cavity in which there is located a conductive member 141 attached to an adjusting screw 133. The effect of the presence of conductive member 141 is to concentrate the magnetic flux lines nearer to the wall portions of the cavity and hence to concentrate the magnetic flux in the ferrite, and also by varying the distance between the conductive member 141 and the opposite wall 142, to tune the cavity. Similarly, cavity 131 may be tuned by means of plunger 134. In addition to the separate adjustability feature of such an arrangement, the signal and pump circuits are isolated, thus making it much simpler to isolate the signal circuits from the much stronger pump frequency energy. This greatly simplifies the coupling to and from the signal circuit.

In operation, a signal to be amplified is coupled to cavity 130 by means of coaxial line 139. The magnetic field lines associated with the standing waves set up in cavity 130 described loops which lie in planes parallel to wall 142, of which $h_1$ is representative. Pump power fed into cavity 131 by coaxial line 143 induces standing waves having magnetic field loops which lie in planes parallel to that of the signal energy standing waves, as shown by loop $h_p$. Core ends 137 and 138 are associated with a magnetic circuit, not shown, and provide the direct current biasing field H in a direction normal to the loops of the pump and signal frequency magnetic fields. The operation of this amplifier is substantially identical to the operation of the amplifier shown in FIG. 17. For example, conditions are adjusted to induce the 1,1,0 mode at the pump frequencies and higher order magnetostatic modes at the signal and idler frequencies. This is done by selecting an appropriate ferrite material and adjusting its shape and the biasing magnetic field. Where conditions preclude complete magnetostatic modes, resonance is established only at the pump and idler frequencies. The location of the ferrite, however, between the two cavities subjects it to a strongly nonuniform signal field which enhances the coupling between the idler and signal frequencies and produces a highly efficient amplifier. The amplified signal is coupled out of cavity 130 by means of coaxial line 140.

It is a feature of this embodiment of the amplifier that by virtue of the use of re-entrant type cavities, the amplifier size may be substantially reduced. Furthermore, the presence of the adjusting member, such as 141, tends to concentrate the field in the ferrite to a much greater extent, further enhancing the coupling between the idler and signal frequencies. As in the case of the amplifier shown in FIG. 17, higher order modes may be induced in ferrite 136 by varying the thickness of the common wall portion 135 or the diameter and shape of ferrite 136, as was explained above.

In the various embodiments of the invention herein described, the ferrite element serves as a coupling element. In the directional couplers or switches, the magnetostatic modes induced in the ferrite are such that the motion of the magnetization within the sample couples to the fields of the two guides and power is transferred from one guide to the other at the same frequency.

In the case of the amplifiers described, power from a local oscillator is fed into one resonant cavity which in turn excites a first magnetostatic mode in the ferrite element. A signal at a different frequency is fed into a second resonant cavity which excites or couples to a different magnetostatic mode. Because of the nonlinear behavior of the magnetization motion, power may be diverted from the pump frequency in a manner so as to amplify the signal frequency. Although in some embodiments each wave-supporting structure sees only a portion of the ferrite body, the motion of the magnetization forms a definite pattern throughout the ferrite such that its effects are shared by both wave-supporting structures. The ferrite therefore serves as a coupling medium of interaction for electromagnetic wave energy. In the amplifiers it serves as a coupling medium of interaction for electromagnetic wave energy of different frequencies.

In all cases, it is understood that the above-described arrangements are merely illustrative of the principles of the invention. Numerous and varied other embodiments may be devised in accordance with these principles by those skilled in the art without departing from the spirit and scope of the invention.

What is claimed is:

1. In combination, first and second electromagnetic wave energy supporting structures having a common conductive partition therebetween, an aperture extending through said conductive partition, an element of gyromagnetic material capable of exhibiting a plurality of magnetostatic modes disposed within said aperture to couple said wave energy between said first and said second structures, means for substantially increasing said coupling comprising magnetic biasing means for inducing one of said magnetostatic resonance modes in said element, and means for varying said magnetic biasing to change the induced mode to another of said magnetostatic modes.

2. In combination, first and second electromagnetic wave supporting structures having a common conductive partition therebetween, an aperture extending through said conductive partition, said aperture being sufficiently small over a predetermined frequency range to substantially preclude the coupling of wave energy between said first structure and said second structure, an element of gyromagnetic material capable of exhibiting a plurality of magnetostatic modes over said range of frequencies disposed within said aperture, means for substantially increasing said coupling over said frequency range comprising magnetic biasing means for inducing magnetostatic resonance modes in said element, and means for varying said magnetic biasing to change the induced mode to another of said magnetostatic modes.

3. A combination according to claim 2 wherein said element is single crystalline gyromagnetic material.

4. In an electromagnetic wave energy system, first and second sections of rectangular waveguide having a common conductive wall region, an aperture extending through said conductive region, said aperture being sufficiently small over a predetermined frequency range to substantially preclude the coupling of wave energy between said first structure and said second structure, an element of material capable of exhibiting a plurality of discrete gyromagnetic resonance absorption peaks disposed in said aperture, a source of magnetic field for biasing said element to one of said peaks and means for varying said magnetic biasing field to change said resonant condition in said element from said one peak to another of said peaks.

5. A combination according to claim 4 wherein said element is symmetrically disposed in said aperture extending equal distances into each of said guides.

6. A combination according to claim 4 wherein said element is asymmetrically disposed in said aperture extending a greater distance into one of said guides than into the other of said guides.

7. A combination according to claim 6 wherein said element is a sphere and wherein the angle between the plane of said common wall and a diameter drawn from said common wall through the center of said sphere makes an angle of 45 degrees.

8. A combination according to claim 7 wherein said angle is 60 degrees.

9. A combination according to claim 6 wherein the plane of said common wall is curved in the region of the aperture.

10. A directional coupler for electromagnetic wave energy comprising two sections of rectangular waveguide having a common wall therebetween, first and second apertures located along the center line of said wall and longitudinally displaced therealong, an element of material capable of exhibiting a plurality of discrete magnetostatic resonance modes disposed in each of said apertures, magnetic biasing means for inducing one of said modes in each of said elements, and means for varying said magnetic biasing to individually change said induced mode in each of said elements to another of said magnetostatic modes.

11. A switch for electromagnetic wave energy comprising first and second substantially identically shaped multibranch waveguiding networks congruently placed contiguous to each other to share common wall regions between pairs of corresponding branches of said networks, an aperture located in the common wall region between each of said pairs of branches, an element of material capable of exhibiting a plurality of discrete magnetostatic resonance modes disposed in each of said apertures, magnetic biasing means for inducing one of said modes in each of said elements, and means for separately varying said magnetic biasing to individually change the induced mode in each of said elements to another of said magnetostatic modes.

12. The combination according to claim 11 wherein said networks comprise a pair of symmetrical shunt Y-junctions.

13. The combination according to claim 11 wherein said apertures are located along the center line of each of said branches.

14. The combination according to claim 11 wherein the distance between any two of said elements is equal to a whole multiple of a wavelength of the wave energy to be switched.

15. The combination according to claim 11 wherein each of said elements couples substantially equal amounts of energy between the branches of said first network and the corresponding branches of said second network.

16. A switch for electromagnetic wave energy comprising first and second symmetrical Y-junctions congruently placed contiguous to each other to share common wall regions between corresponding pairs of branches of said networks, each of said corresponding pairs of branches of said networks, each of said corresponding pairs of branches having a first aperture located in the common wall region therebetween, at least one of said pairs of branches having a second aperture displaced a quarter of a wavelength of the frequency to be switched from said first aperture between said one of said pairs of branches, an element of material exhibiting a plurality of discrete magnetostatic resonance modes disposed in each of said apertures, magnetic biasing means for inducing one of said modes in each of said elements, and means for separately varying said magnetic biasing to individually change the induced mode in each of said elements to another of said magnetostatic modes.

17. First and second resonant cavities comprising intersecting conductively bounded channels having top and bottom walls, a conductive strip supported within one of said channels and extending longitudinally therein with the broad faces thereof parallel to said top and bottom walls, said strip having an aperture centrally located through said broad faces, an element of material capable of exhibiting a plurality of discrete magnetostatic resonance modes disposed in said aperture, means for applying a magnetic field to said element, and means for coupling electromagnetic wave energy to both of said channels.

18. First and second contiguously disposed resonant cavities comprising two physically and electrically separate conductively bounded chambers having a common wall region, each of said cavities capable of supporting an independent wave field within distinct frequency bands, means for separately tuning said cavities over a range of frequencies, an aperture extending through said common wall having therein an element of material capable of exhibiting a plurality of discrete magnetostatic resonance modes, means for applying a magnetic field to said element, and means for coupling electromagnetic wave energy to both of said cavities.

19. In combination, at least three conductively bounded microwave transmission lines, means for coupling wave energy among said lines comprising an element of gyromagnetic material capable of exhibiting a plurality of discrete magnetostatic resonance modes, said element extending into each of said lines through an aperture in the conductive boundary of each of said lines, magnetic biasing means for inducing one of said modes in said element, and means for separately varying said magnetic biasing to change the induced mode in said element to another of said magnetostatic modes.

20. A directional coupler for electromagnetic wave energy comprising at least three conductively bounded microwave transmission lines, means for coupling wave energy among said lines comprising first and second elements of gyromagnetic material capable of exhibiting a plurality of discrete magnetostatic resonance modes, each of said elements extending into each of said lines through an aperture in the conductive boundary of each of said lines, magnetic biasing means for inducing one of said modes in each of said elements, and means for separately varying said magnetic biasing to individually change the induced mode in at least one of said elements to another of said magnetostatic modes.

21. The combination according to claim 20 wherein the electrical distance between said first and said second elements is a quarter wavelength at said given frequency.

References Cited in the file of this patent

UNITED STATES PATENTS

| | | |
|---|---|---|
| 2,810,882 | Walker | Oct. 22, 1957 |
| 2,849,687 | Miller | Aug. 26, 1958 |
| 2,922,125 | Suhl | Jan. 19, 1960 |

OTHER REFERENCES

Damon: "Journal of Applied Physics," vol. 26, No. 10, October 1955, pages 1281–1282.

Dillon: "Physical Review," January 15, 1957, pages 759–760.

Berk et al.: "Proceedings of the IRE," October 1956, pages 1439–1445.